(12) United States Patent
Abraham et al.

(10) Patent No.: US 7,283,502 B1
(45) Date of Patent: Oct. 16, 2007

(54) ENHANCEMENT OF FRAMING PROTOCOL FRAME FORMAT TO SUPPORT QUALITY OF SERVICE

(75) Inventors: Santosh P Abraham, Keasbey, NJ (US); Mooi Choo Chuah, Marlboro, NJ (US); Kameswara Rao Medapalli, Ocean, NJ (US); Ashwin Sampath, Somerset, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 804 days.

(21) Appl. No.: 09/666,809

(22) Filed: Sep. 21, 2000

(51) Int. Cl.
*H04L 12/56* (2006.01)
*H04L 29/06* (2006.01)

(52) U.S. Cl. ..................... 370/337; 370/347

(58) Field of Classification Search ............. 370/310.1, 370/310.2, 337, 349, 468, 522, 467, 347; 455/68, 72, 436, 439, 442, 507, 513, 522, 455/525, 412.1, 414.2, 414.3, 414.4, 452.2, 455/450, 456.5
See application file for complete search history.

(56) References Cited

U.S. PATENT DOCUMENTS

| | | | | |
|---|---|---|---|---|
| 6,374,112 | B1 * | 4/2002 | Widegren et al. | 455/452.2 |
| 6,567,396 | B1 * | 5/2003 | Pohjanvouri et al. | 370/349 |
| 6,618,591 | B1 * | 9/2003 | Kalliokulju et al. | 455/452.2 |
| 6,654,610 | B1 * | 11/2003 | Chen et al. | 455/450 |
| 6,839,356 | B2 * | 1/2005 | Barany et al. | 370/401 |

FOREIGN PATENT DOCUMENTS

| EP | 1 030 484 A | 8/2000 |
|---|---|---|
| EP | 1 030 484 A2 * | 8/2000 |
| WO | WO99/48310 * | 9/1999 |

OTHER PUBLICATIONS

Braden, R, Resource ReSerVation Protocol (RSVP) Version 1 Functional Specification, Sep. 1997, Internet Engineering Task Force, RFC2205.*
3 G TS 25.430 v3.2.0 (Jun. 2000) 3rd Generation Partnership Project; Technical Specification Group Radio Access Network; UTRAN $I_{ub}$ Interface: General Aspects and Principles, (Release 1999).
3 G TS 25.427 v3.3.0 (Jun. 2000) 3rd Generation Partnership Project; Technical Specification Group Radio Access Network; UTRAN Iub/Iur Interface User Plane Protocol for DCH Data Streams, (Release 1999).
3 G TS 25.420 v3.1.0 (Mar. 2000) 3rd Generation Partnership Project; Technical Specification Group Radio Access Network; UTRAN $I_{ur}$ Interface General Aspects and Principles, (Release 1999).

(Continued)

Primary Examiner—Derrick W. Ferris

(57) ABSTRACT

In a UMTS (universal mobile telecommunications system) Terrestrial Radio Access Network (UTRAN) based wireless system, a wireless network element (e.g., a base station) exchanges information with another wireless network element (e.g., a radio network controller) via data frames (uplink or downlink). Each data frame comprising a header portion and a payload portion, which comprises a QoS class indicator field. Illustratively, the eight bit spare extension field of a UTRAN data frame (uplink or downlink) is used to convey a four bit payload type indicator and a four bit QoS class indicator.

11 Claims, 7 Drawing Sheets

OTHER PUBLICATIONS

3 G TS 25.410 v3.2.0 (Mar. 2000) 3rd Generation Partnership Project; Technical Specification Group Radio Access Network; UTRAN Iu Interface: General Aspects and Principles, (Release 1999).

3 G TS 25.401 v3.3.0 (Jun. 2000) 3rd Generation Partnership Project; Technical Specification Group Radio Access Network; UTRAN Overall Description, (Release 1999).

3 G TS 25.302 v3.5.0 (Jun. 2000) 3rd Generation Partnership Project; Technical Specification Group Radio Access Network; Services provided by the Physical Layer, (Release 1999).

3 G TS 25.301 v3.5.0 (Jun. 2000) 3rd Generation Partnership Project; Technical Specification Group Radio Access Network; Radio Interface Protocol Architecture, (Release 1999).

3 G TR 23.930 v3.5.0 (Jul. 1999) 3rd Generation Partnership Project; Technical Specification Group Group Services and System Aspects Iu Principles (3G TR 23.930 version 3.0.0).

Kalliokulju et al, "Quality of Service Management Functions in 3generation Mobile Telecommunication Networks", *Wireless Communications and Networking Conference, 1999. WCNC. 1999 IEEE New Orleans, LA, USA Sep. 21-24, 1999*, pp. 1283-1287.

ETSI—3GPP: "TS 125.427 v3.3.0—MTS; Universal Mobile Telecommunications System (UMTS) UTRAN Iub/Iur Interface User Plane Protocol for DCH Data Streams (3G TS 25.427 version 3.3.0 Release 1999)", *ETSI Technical Specification*, Jun. 2000.

ETSI 3rd Generation Partnership Project (3GPP), "Universal Mobile Telecommunications System (UMTS) UTRAN Iub/Iur Interface User Plane Protocol for DCH Data Streams (3G TS 25.427 version 3.3.0 Release 1999)", ETSI TS 125 427 V3.3.0 (Jun. 2000), XP-002182248.

Juah Kalliokulju, "Quality of Service Management Functions in 3rd Generation Mobile Telecommunication Networks", 1999 IEEE Wireless Communications and Networking Conference, New Orleans, Louisiana, USA, Sep. 21-24, 1999, pp. 1283-1287, XP-010353696.

\* cited by examiner

ENHANCEMENT OF FRAMING PROTOCOL FRAME FORMAT TO SUPPORT QUALITY OF SERVICE

FIELD OF THE INVENTION

This invention relates generally to communications and, more particularly, to packet communications systems.

BACKGROUND OF THE INVENTION

The wireless market is continuing to grow, and is now beginning to support a diverse set of applications (e.g., in addition to cellular telephones, it is now possible to purchase small hand-held devices such as the Palm VII™, which provide access to the Internet via a wireless connection to a service provider.) As part of the ongoing wireless development, the $3^{rd}$ Generation Partnership Project (3GPP) is working on a UMTS (universal mobile telecommunications system) Terrestrial Radio Access Network (UTRAN). (3GPP is a standards body comprising the European Telecommunication Standards Institution (ETSI) and several other international standards bodies. Additional information on 3GPP can be found at: "http://www.3gpp.org.")

Currently, in UTRAN, data transmissions between a "Node B" (NB) (also referred to herein as a base station) and a radio network controller (RNC)) are defined by dedicated transport channel (DCH) frame protocol (FP) procedures (referred to in UTRAN as the Iub interface). (As used herein, both the NB and the RNC are also representative of wireless network elements.) In particular, the FP procedures define uplink (from an NB to an RNC) and downlink (from an RNC to an NB) data frames. Each data frame (uplink or downlink) comprises a header portion and a payload portion (also referred to as a protocol data unit (PDU)), and supports multiplexing a number of DCHs in the payload portion. Each DCH comprises transport blocks (TBs), which are the basic units used to convey data. The size and number of TBs in each DCH of a data frame is identified by an associated transport format indicator (TFI) in the header portion of the data frame. It should also be noted that these DCH FP procedures also apply to communications between RNCs (referred to in UTRAN as the Iur interface).

SUMMARY OF THE INVENTION

Notwithstanding the association of a TFI field with each DCH in a UTRAN data frame for specifying, effectively, the size of each DCH in the payload portion of the data frame, we have realized that it is also advantageous to further associate each payload of a data frame with a Quality of Service (QoS). Therefore, and in accordance with the invention, a node of a UTRAN based network formats data into a UTRAN data frame comprising a header portion, a payload portion and a quality of service field associated with the payload portion for transmission to another node of the UTRAN-based network.

In an embodiment of the invention, a wireless network element (e.g., a base station) exchanges information with another wireless network element (e.g., a radio network controller) via data frames (uplink or downlink). Each data frame comprising a header portion and a payload portion, which comprises a QoS field (or QoS indicator).

In another embodiment of the invention, the eight bit spare extension field of a UTRAN data frame (uplink or downlink) is used to convey a four bit payload type indicator and a four bit QoS class indicator.

DETAILED DESCRIPTION

The inventive concept is described in the context of a UMTS (universal mobile telecommunications system) Terrestrial Radio Access Network (UTRAN) based wireless network but is not so limited. Other than the inventive concept, the details of a UTRAN based wireless network are well known and are not described herein (e.g., UTRAN specifications can be found at "http://www.3gpp.org."). Further, the inventive concept is implemented using conventional programming techniques, which as such, will not be described herein.

Figure 1:
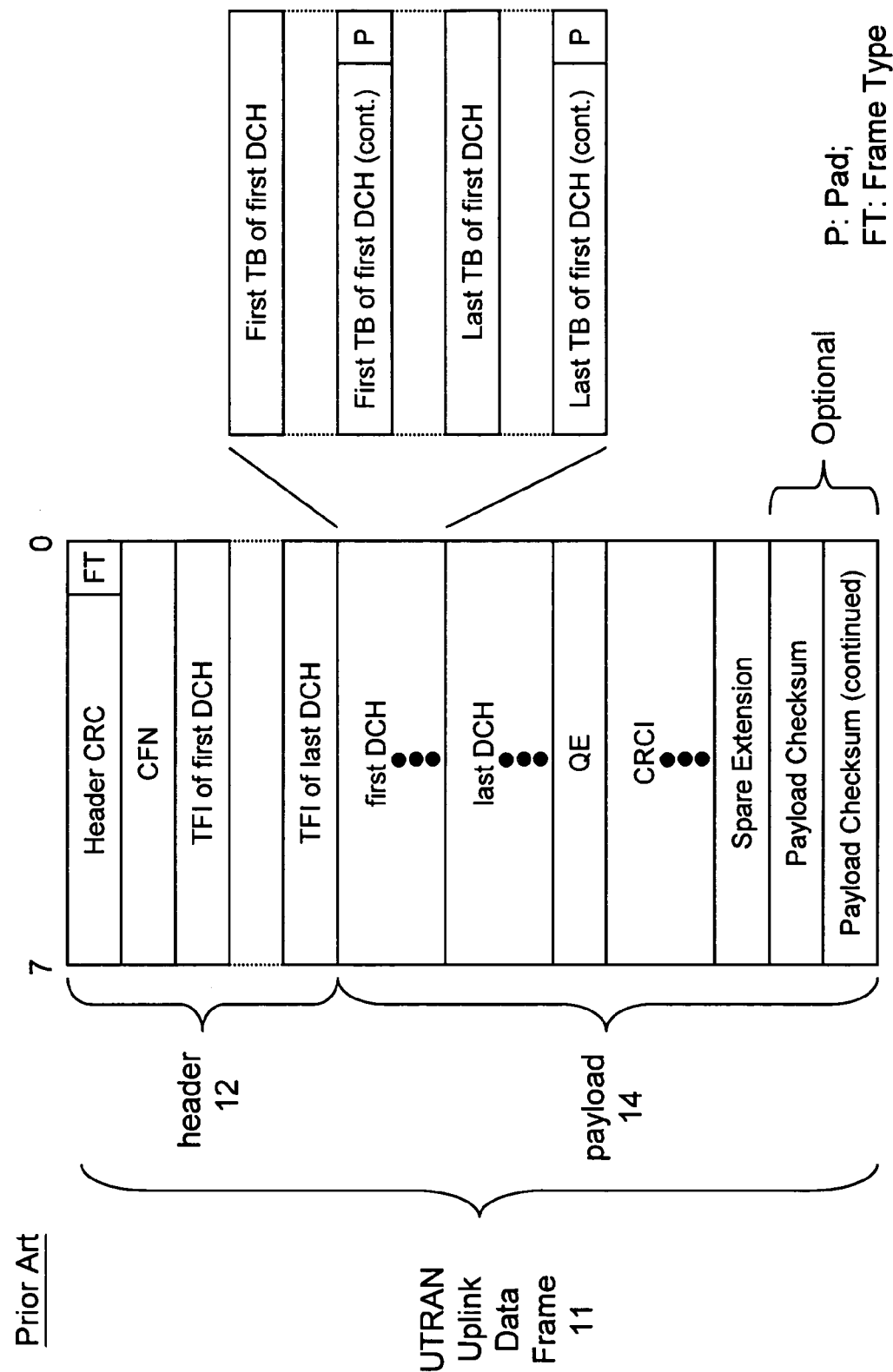
FIGS. 1 and 2 show prior art UTRAN data frames (uplink and downlink)
Figure 2:
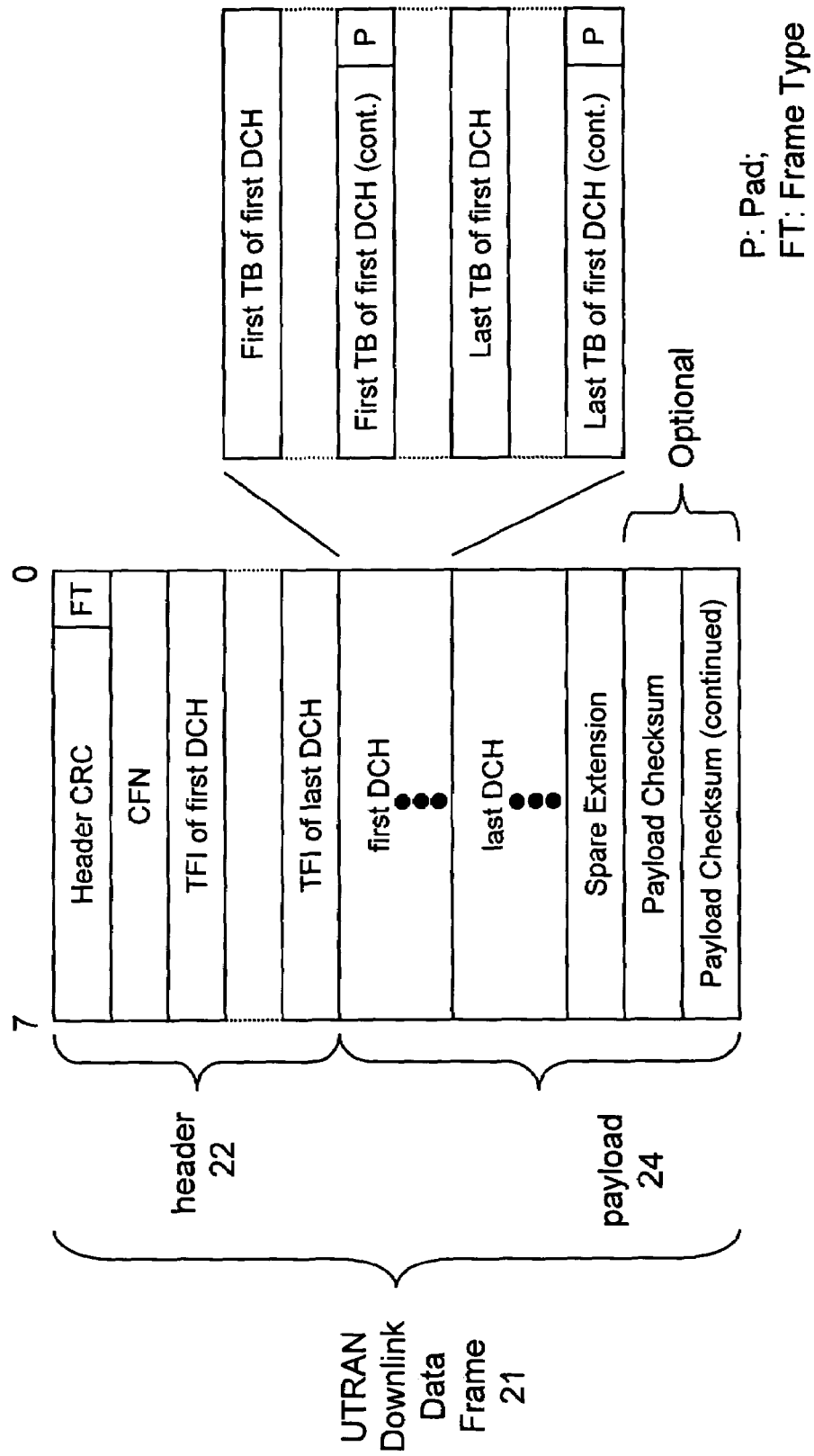

As reference, two prior art UTRAN data frames are shown in FIGS. 1 and 2 (e.g., see Technical Specification (TS) 25.427 V.3.3.0: UTRAN Iub/Iur Interface User Plane Protocol for DCH Data Streams for more information about the fields shown in FIGS. 1 and 2). FIG. 1 shows an illustrative UTRAN uplink data frame 11. The latter comprises a header portion 12 and a payload portion 14. The header portion 12 further comprises a header cyclic redundancy check (CRC) field (7 bits), a frame type (FT) field (1 bit), a connection frame number (CFN) field (8 bits), and at least one transport format indicator (TFI) field (8 bits) associated with a respective DCH conveyed in the payload portion 14. A particular value of each TFI field describes, effectively, the size of the associated DCH, i.e., transport block (TB) length and TB set size. As noted earlier, the payload portion 14 supports multiplexing a number of DCHs. This is illustrated by FIG. 1 by the "first DCH" and the "last DCH" portions of payload 14. (For reference purposes, each DCH portion comprises a number of transport blocks (TBs) as illustrated in FIG. 1 for the first DCH of FIG. 1. It may be necessary to insert padding at the end of each TB, as represented by the P field (which although shown as a single bit in FIG. 1, is any number of bits necessary to make a TB an integer number of octets).) Following the DCHs is a quality estimate field (QE) (8 bits), a group of CRC indicator (CRCI) bits (there is one CRCI bit for each TB), a spare extension field (8 bits) and, optionally, a payload checksum field (16 bits).

In a similar fashion, FIG. 2 shows an illustrative UTRAN downlink data frame 21. The latter comprises a header portion 22 and a payload portion 24. The header portion 22 further comprises a header cyclic redundancy check (CRC) field (7 bits), a frame type (FT) field (1 bit), a connection frame number (CFN) field (8 bits), and at least one transport format indicator (TFI) field (8 bits) associated with a respective DCH conveyed in the payload portion 24. Like downlink frame 11, the payload portion 24 supports multiplexing a number of DCHs. Following the DCHs is a spare extension field (8 bits) and, optionally, a payload checksum field (16 bits).

Notwithstanding the association of a TFI field with each DCH in a UTRAN data frame for specifying, effectively, the size of each DCH in the payload portion of the data frame, we have realized that it is also advantageous to further associate each payload of a data frame with a Quality of Service (QoS). Therefore, and in accordance with the invention, a node of a UTRAN based network formats data into a UTRAN data frame comprising a header portion and a payload portion, which comprises a quality of service field associated with the payload portion for transmission to another node of the UTRAN-based network.

Figure 3:
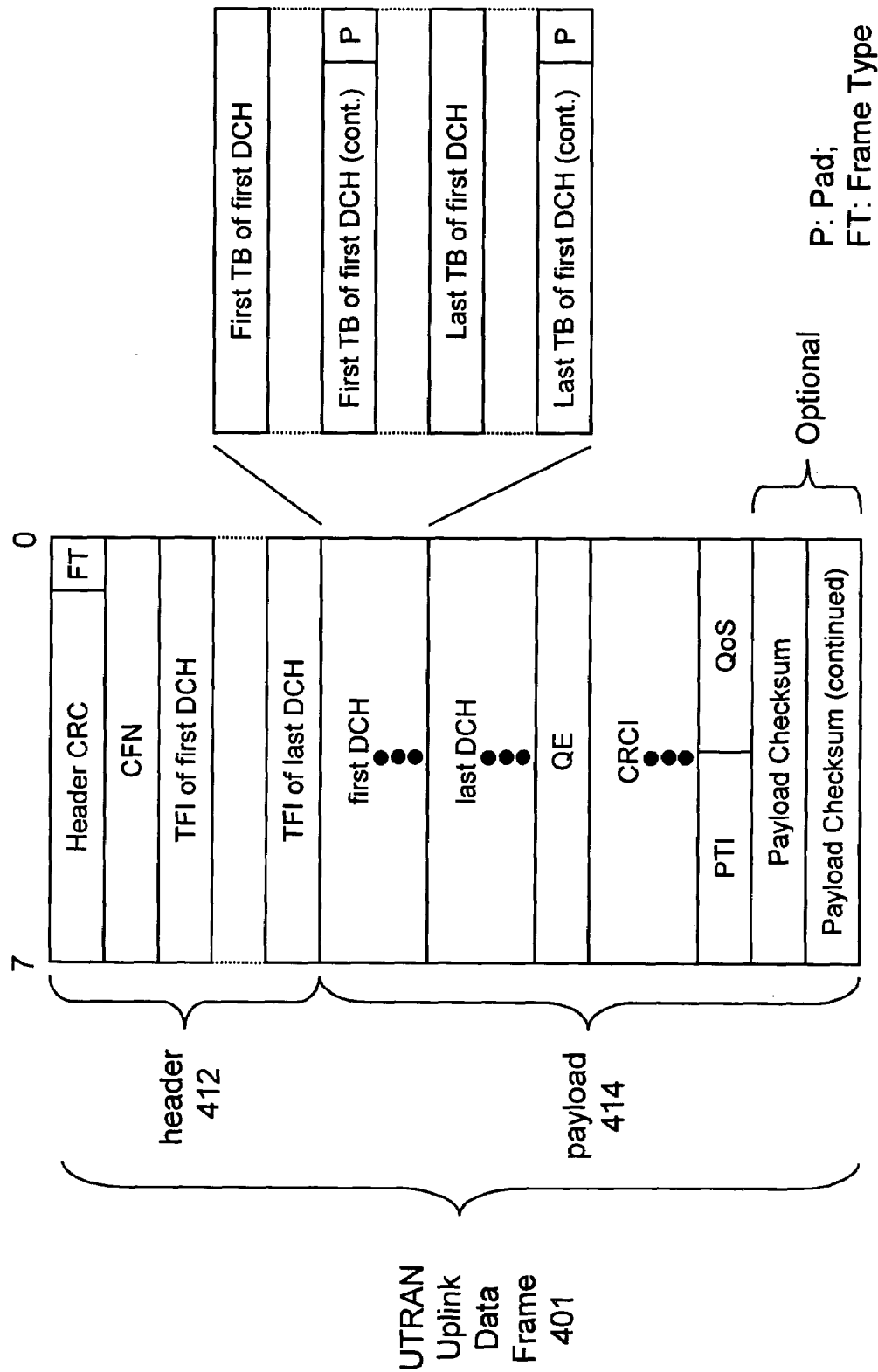
FIGS. 3 and 4 show illustrative UTRAN data frames (uplink and downlink) in accordance with the principles of the invention.
Figure 4:
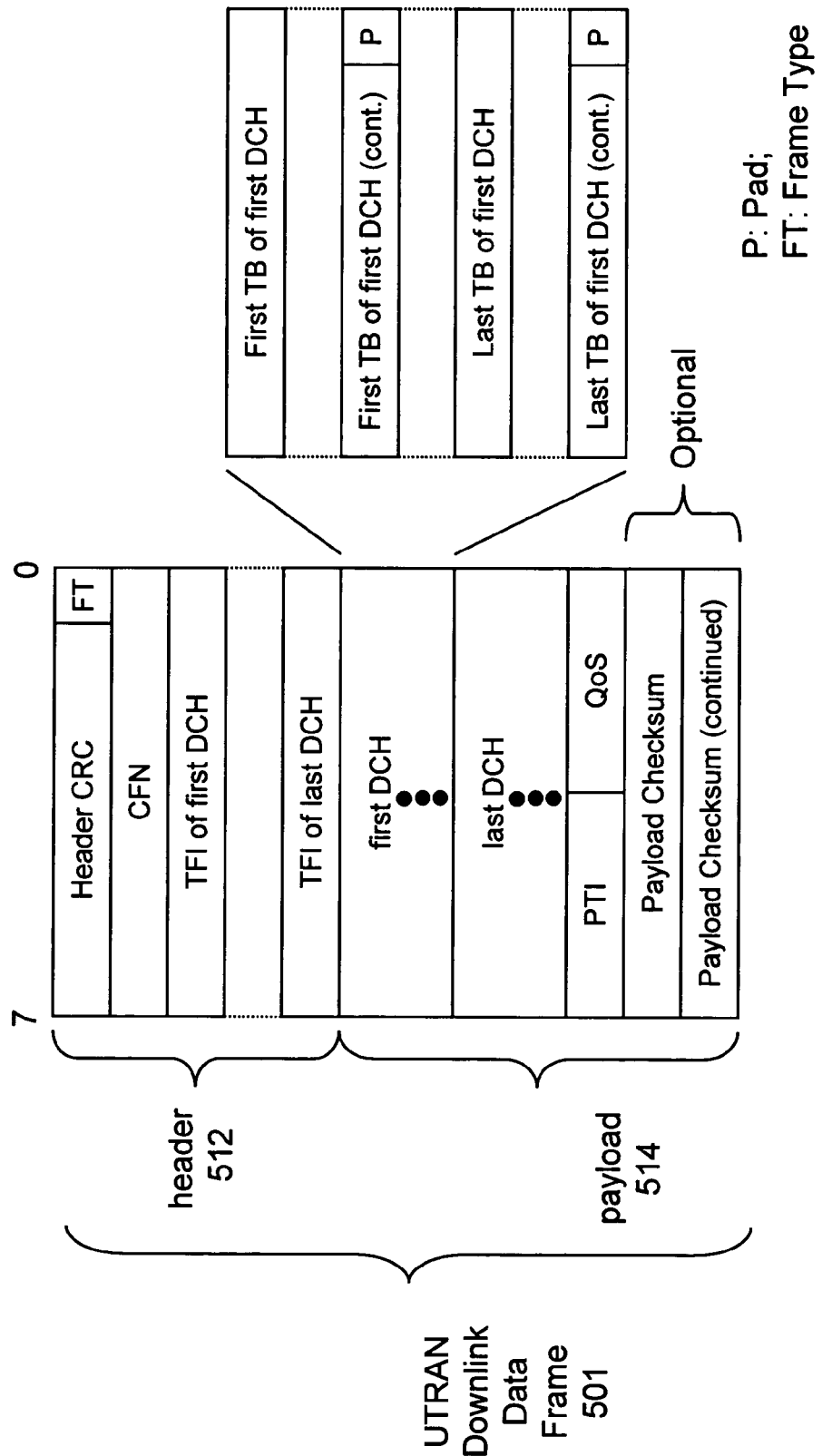

Illustrative uplink and downlink UTRAN data frames modified in accordance with the principles of the invention are shown in FIGS. 3 and 4 for use over either the Iub or the Iur interface. Other than the inventive concept, the structure of these uplink and downlink UTRAN data frames is similar to the data frames shown in FIGS. 1 and 2, and, as such, this structure will not be described again. FIG. 3 illustrates a UTRAN uplink data frame 401 comprising a header portion 412 and a payload portion 414. The payload portion includes, in accordance with the invention, a payload type indicator (PTI) field (4 bits) and a QoS field (4 bits). Thus, a value of each PTI field represents the type of payload and a value of the QoS field indicates a type of QoS to be provided by wireless network elements for that payload. Turning now to FIG. 4, this figure illustrates a UTRAN downlink data frame 501 comprising a header portion 512 and a payload portion 514. Similar to uplink payload portion 414, the payload portion 514 includes a payload type indicator (PTI) field (4 bits) and a QoS field (4 bits). Thus, a value of each PTI field represents the type of payload and a value of the QoS field indicates a type of QoS to be provided by wireless network elements for that payload.

Figure 5:
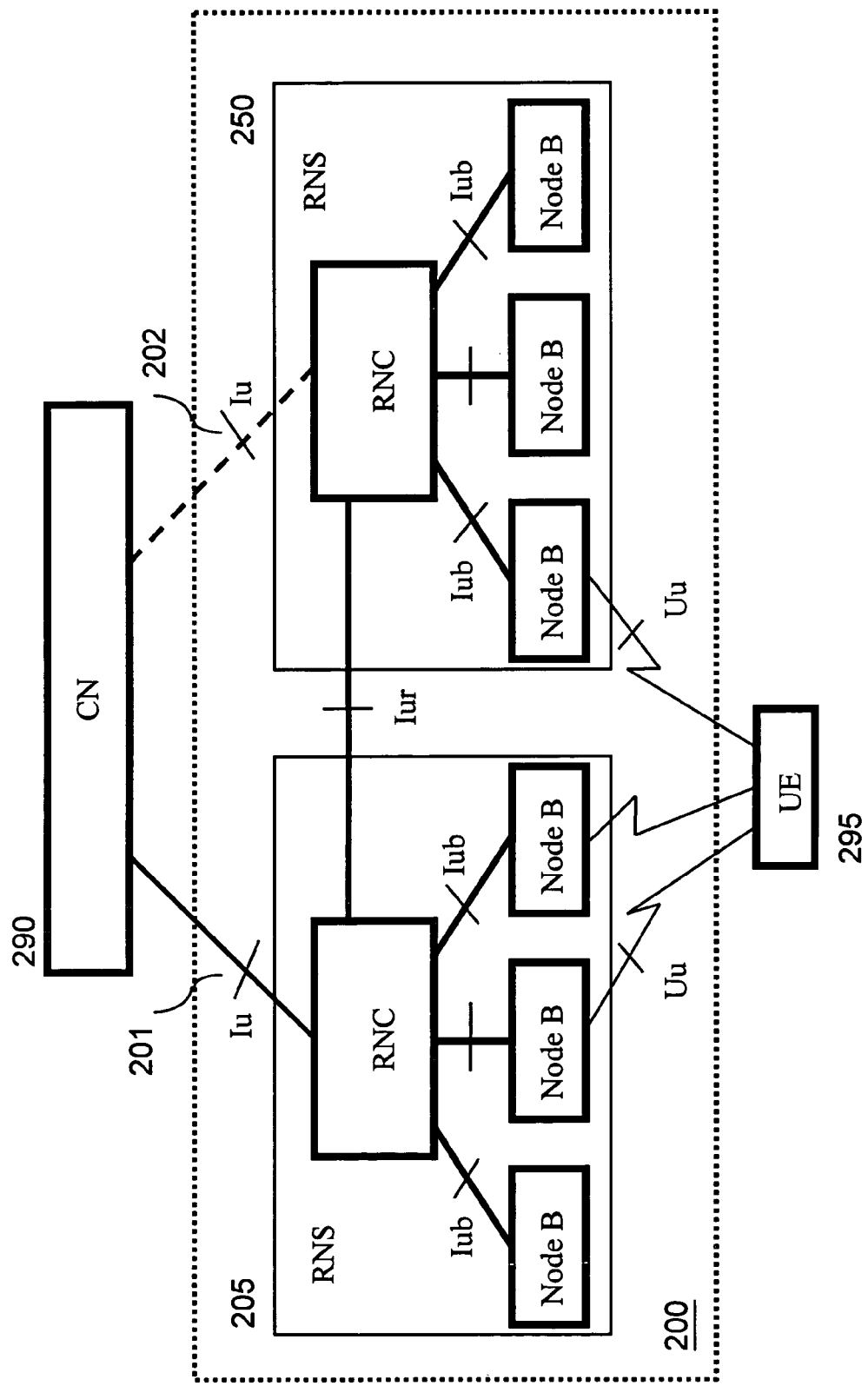
FIG. 5 shows a portion of a UTRAN based wireless system in accordance with the principles of the invention.

A portion of a UTRAN based wireless system in accordance with the principles of the invention is shown in FIG. 5. Other than the inventive concept, the elements and interfaces shown in FIG. 5 are well-known and will not be described in detail (e.g., see Technical Specification (TS) 25.401 V.3.3.0: UTRAN Overall Description for more information). UTRAN 200 is coupled to a core network (CN) 290 via an Iu interface. (It should be noted that the core network may be split into separate domains, e.g., a circuit switched core network and a packet switched core network. In this case, there is one Iu interface for each domain. The core network represents, e.g., other servers and gateways for providing access to the public switched telephone network and/or packet networks (like the Internet).) UTRAN 200 is also coupled to user equipment (UE) (e.g., a wireless mobile endpoint like a telephone and/or computer), as represented by UE 295, via interface Uu. UTRAN 200 comprises, e.g., a number of radio network subsystems (RNS) as represented by RNS 205 and RNS 250, which are coupled together via an Iur interface. Each RNS comprises at least one radio network controller (RNC), and at least one Node B (NB). A Node B (as noted above also referred to as a base station) is coupled to an RNC through an Iub interface and is coupled to a UE through a Uu interface. For each connection between user equipment and the UTRAN, one RNS is the Serving RNS (here, illustratively, RNS 205, which communicates via Iu 201 with CN 290). Another RNS could be what is referred to as a Drift RNS (here, illustratively, RNS 250, which, if necessary, communicates via Iu 202 with CN 290). In accordance with the inventive concept, communications over the Iub interface and/or the Iur interface utilize an modified FP PDU as illustrated in FIG. 3 for uplink communications and FIG. 4 for downlink communications wherein at least a QoS field is associated with each payload type. (It should be observed from FIGS. 3 and 4 that although considered part of the payload portion of the data frame, the QoS field could instead be included in another part of the data frame, e.g., the header portion.) It should also be noted that the inclusion of a QoS field in an FP PDU facilitates scheduling at not only the Iub interface, but also the Iur interface.

Illustratively, the QoS field is four bits wide. However, not all of the sixteen possible values need be defined. For example, UMTS allows definition of four QoS classes: conversational, streaming, interactive and background. With respect to the payload type indicator field (also illustratively defined herein as four bits wide), this field is useful to associate different payload types with a particular QoS. As such, an RNS can now utilize QoS information for multiplexing those dedicated transport channels having the same QoS into the same FP PDU.

Figure 6:
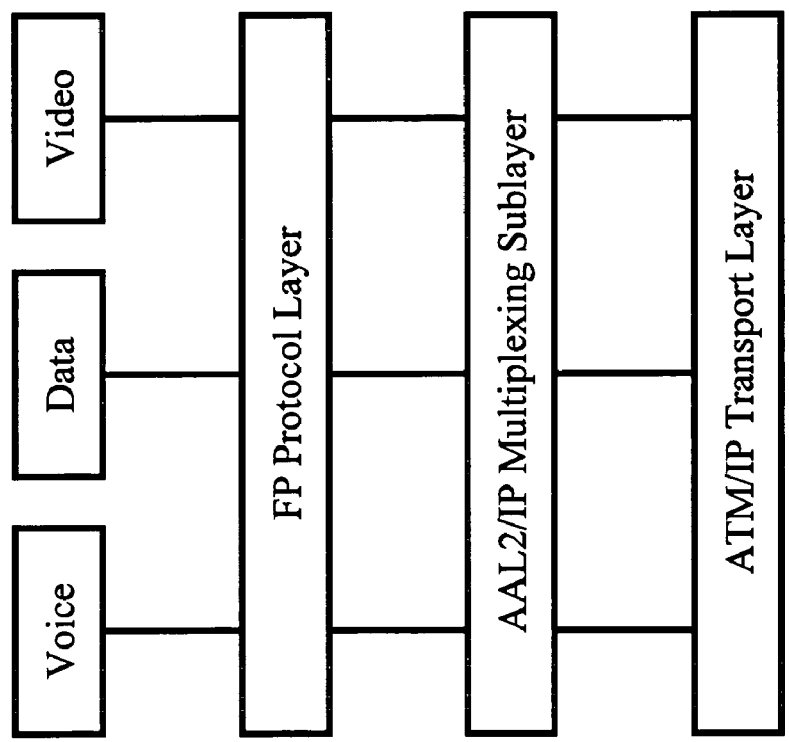
FIG. 6 illustrates a protocol layer of use in accordance with the principles of the invention.

Turning now to FIG. 6, it should be observed than an FP PDUs can be multiplexed within an IP (Internet protocol) packet. In particular, this figure illustrates an AAL2/IP (Internet Protocol) multiplexing sublayer of a UTRAN wireless system. (An ATM Adaptation Layer (AAL) maps the services offered by a network to the services required by the application. There are a number of industry standards and proposed standards covering various AALs. In particular, "B-ISDN ATM Adaptation Layer Type 2 Specification," draft Recommendation 1.363.2, November 1996, of ITU-T (herein referred to as AAL2).) As such, an IP multiplexing sublayer can decide whether or not to multiplex the FP PDUs within an IP packet and decide also on the IP Diffserv CodePoints to carry the encapsulated FP PDUs. (Information on Expedited Forwarding (EF) Service, Assured Forwarding (AF) Service, differential service codepoints can be found in, e.g., "An Architecture for Differentiated Services," RFC2475, December 1998 by S. Blake, et al.; "An Expedited Forwarding PHB", draft-ietf-diffserv-phb-ef-01.txt, November 1998, by V. Jacobson, et al., and "Assured Forwarding PHB Group", draft-ietf-diffserv-af-03.txt, December 1998, by J. Heinanen, et al.) For example, an FP QoS class can be set to a value of 0 to indicate "conversational," a value of 1 to indicate "Streaming audio," a value of 2 to indicate "streaming video," a value of 3 to indicate "interactive," and a value of 4 to indicate "Background." Then, the IP multiplexing sublayer can decide to mark the PTI field of the encapsulated FP PDU packet (which is an IP packet) with an EF code point if it is conversational class, or with an appropriate AF codepoint if it is interactive class etc. Alternatively, the FP QoS can be set to class 0 to be raw voice, class 1 to be compressed RTP/UDP/IP packets carrying voice, class 2 to streaming audio, class 3 to streaming video, class 4-6 for interactive, class 7 to background etc. Then, the appropriate multiplexed header is used for raw voice, compressed RTP/UDP/IP packets that carry conversational voice, streaming audio or streaming video.

Figure 7:
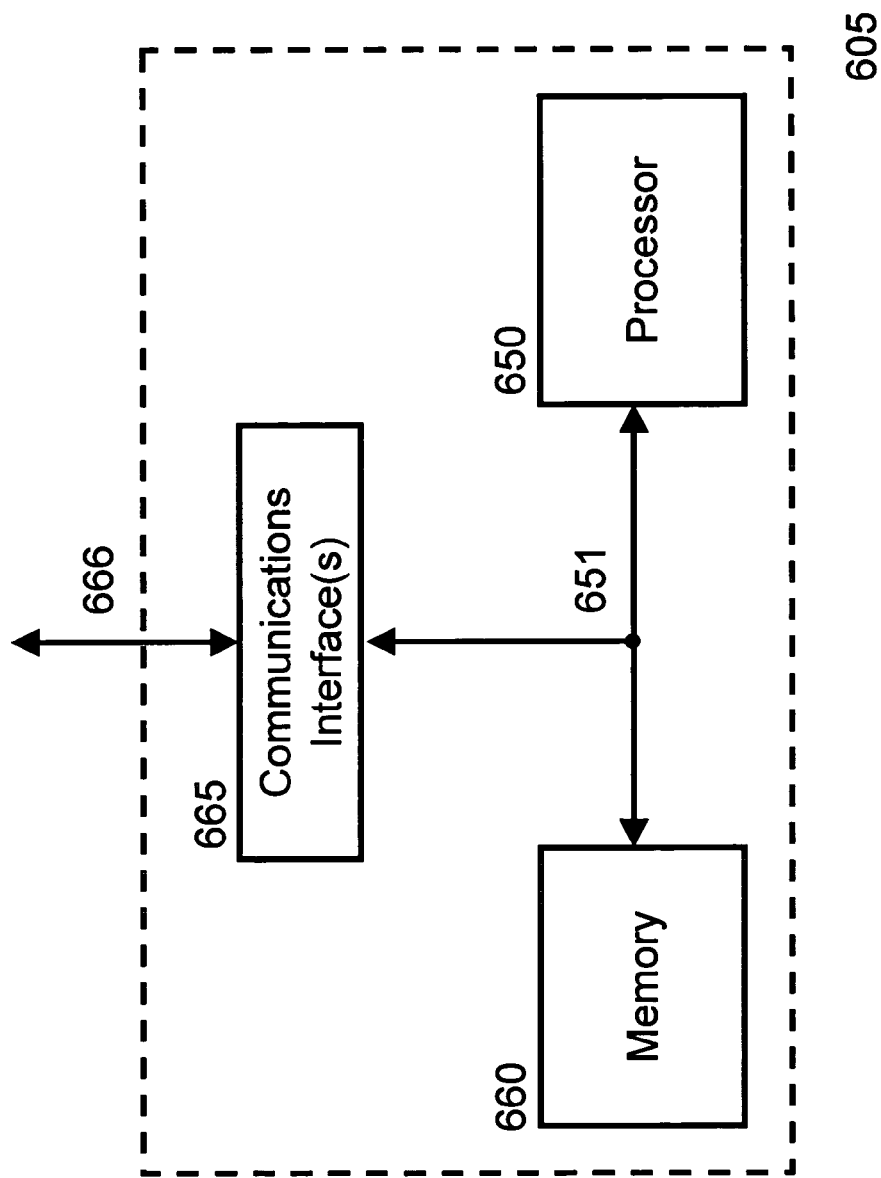
FIG. 7 shows an illustrative high-level block diagram of a wireless network element for use in accordance with the principles of the invention.

Turning briefly to FIG. 7, a high-level block diagram of a representative wireless network element 605 for use in accordance with the principles of the invention is shown. Wireless network element 605 is a stored-program-control based processor architecture and includes processor 650, memory 660 (for storing program instructions and data, e.g., for forming the above-described data frames illustrated in FIGS. 3 and 4, etc.) and communications interface(s) 665 for coupling to one or more packet communication paths as represented by path 666 (e.g., 665 represents a transmitter and a receiver). In the context of this invention, e.g., processor 650 and memory 660 represent a formatter for forming the data frames illustrated in FIGS. 3 and 4 for transmission via communications interface 665, representative of a radio frequency transmitter.

The foregoing merely illustrates the principles of the invention and it will thus be appreciated that those skilled in the art will be able to devise numerous alternative arrangements which, although not explicitly described herein, embody the principles of the invention and are within its spirit and scope. For example, although illustrated in the context of a UTRAN-based wireless system, the inventive concept is applicable to any system (e.g., wired, etc.) that addresses QoS.

What is claimed is:

1. A method for use in a node of a UMTS (universal mobile telecommunications system) Terrestrial Radio Access Network (UTRAN) based network for exchanging data with another node of the UTRAN based network, the method comprising the steps of:
    formatting data into a UTRAN data frame, the UTRAN data frame comprising a header portion, a payload portion for conveying the data and a quality of service (QoS) field associated with the payload portion; and
    transmitting the UTRAN data frame to the other node,
    wherein the payload portion comprises a number of dedicated channels (DCHs) and the QoS field, each dedicated channel comprising a number of transport blocks (TBs), and the header portion comprises a number of transport format indicators (TFI) fields each associated with one of the number of DCHs, each TFI indicating a size of one of the number of DCHs.

2. The method of claim 1 wherein the payload portion further comprises a payload type indicator field.

3. The method of claim 1, wherein the QoS field is transmitted within the payload portion.

4. The method of claim 1 wherein the UTRAN data frame further comprises a payload type indicator field.

5. A method for use in a wireless network element, the method comprising the steps of:
    formatting data into a data frame, the data frame comprising a header portion, a payload portion and a quality of service (QoS) field associated with the payload portion; and
    transmitting the data frame to another node of the wireless network,
    wherein the payload portion comprises a number of dedicated channels (DCHs) and the QoS field, each dedicated channel comprising a number of transport blocks (TBs), and the header portion comprises a number of transport format indicators (TFI) fields each associated with one of the number of DCHs, each TFI indicating a size of one of the number of DCHs.

6. The method of claim 5 wherein the payload portion further comprises a payload type indicator field.

7. The method of claim 5 wherein the QoS field is transmitted within the payload portion.

8. A transmission frame representing data embodied in a wireless transmission signal, the transmission frame comprising:
    a payload portion comprising at least one dedicated transport channel (DCH) portion, wherein the at least one DCH portion further comprises a number of transport blocks (TB) for conveying data; and
    a header comprising at least one transport format indicator (TFI) field for the at least one DCH portion, wherein a value of the TFI field represents a size of the at least one DCH; and
    a quality of service (QoS) field associated with the payload portion and transmitted within the payload portion.

9. The transmission frame of claim 8 wherein the payload portion further comprises a payload type indicator field.

10. Apparatus for use in a wireless network element, the apparatus comprising:
    a formatter for forming a data frame, the data frame comprising a payload portion comprising at least one dedicated transport channel (DCH) portion, wherein the at least one DCH portion further comprises a number of transport blocks (TB) for conveying data, and a header portion comprising at least one transport format indicator (TFI) field for the at least one DCH portion, wherein a value of the TFI field represents a size of the at least one DCH; and
    a quality of service (QoS) field associated with the payload portion and transmitted within the payload portion; and
    a radio frequency transmitter for transmitting the data frame to another wireless network element.

11. The transmission frame of claim 10 wherein the payload portion further comprises a payload type indicator field.

* * * * *